(12) United States Patent
Hatano et al.

(10) Patent No.: US 7,949,733 B2
(45) Date of Patent: May 24, 2011

(54) DRIVER MANAGEMENT METHOD, DRIVER MANAGEMENT APPARATUS, AND DRIVER MANAGEMENT PROGRAM

(75) Inventors: Yoshiaki Hatano, Kanagawa (JP);
Yoshiyuki Miyashita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 997 days.

(21) Appl. No.: 10/971,050

(22) Filed: Oct. 25, 2004

(65) Prior Publication Data

US 2005/0168771 A1  Aug. 4, 2005

(30) Foreign Application Priority Data

Feb. 2, 2004  (JP) .................................. 2004-025483
Feb. 13, 2004  (JP) .................................. 2004-036666

(51) Int. Cl.
*G06F 15/177* (2006.01)

(52) U.S. Cl. ........ 709/220; 709/249; 709/219; 709/223; 709/230; 709/218; 358/1.13; 358/1.15; 711/118; 719/321; 235/435

(58) Field of Classification Search ........... 709/220–222
See application file for complete search history.

(56) References Cited

U.S. PATENT DOCUMENTS

| | | | | |
|---|---|---|---|---|
| 6,714,992 B1 * | 3/2004 | Kanojia et al. | ................. | 719/321 |
| 2002/0067504 A1 * | 6/2002 | Salgado et al. | ............... | 358/1.15 |
| 2003/0164977 A1 * | 9/2003 | Aagesen | ....................... | 358/1.15 |
| 2003/0184782 A1 * | 10/2003 | Perkins et al. | ................ | 358/1.13 |

FOREIGN PATENT DOCUMENTS

| | | |
|---|---|---|
| JP | A-06-274292 | 9/1994 |
| JP | A-07-295915 | 11/1995 |
| JP | A-11-259410 | 9/1999 |
| JP | A-2000-215128 | 8/2000 |
| JP | A-2001-034480 | 2/2001 |
| JP | A-2001-117834 | 4/2001 |
| JP | 2001325170 A * | 11/2001 |
| JP | A-2002-007133 | 1/2002 |
| JP | A-2002-052785 | 2/2002 |
| JP | A-2002-202944 | 7/2002 |
| JP | A-2002-251366 | 9/2002 |
| JP | A-2002-259089 | 9/2002 |
| JP | A-2002-366502 | 12/2002 |
| JP | A-2003-006133 | 1/2003 |
| JP | A-2003-084984 | 3/2003 |
| JP | A-2003-131827 | 5/2003 |
| JP | A-2003-140852 | 5/2003 |

(Continued)

OTHER PUBLICATIONS

Jan. 5, 2010 Refusing Reason Notice issued in Japanese Patent Application No. 2004-025483 (with translation).

(Continued)

*Primary Examiner* — Rupal D Dharia
*Assistant Examiner* — Hua Fan
(74) *Attorney, Agent, or Firm* — Oliff & Berridge, PLC

(57) ABSTRACT

Driver management method, driver management apparatus and driver management program which manages drivers corresponding to devices connected to a network, in which devices connected to a subnet of the network are detected, and drivers corresponding to the devices connected to the subnet, of drivers installed in a user terminal are presented to a user.

5 Claims, 17 Drawing Sheets

FOREIGN PATENT DOCUMENTS

| | | |
|---|---|---|
| JP | A-2003-173246 | 6/2003 |
| JP | A-2003-241876 | 8/2003 |
| JP | A-2003-241925 | 8/2003 |
| JP | A-2003-280843 | 10/2003 |
| JP | A-2003-280851 | 10/2003 |
| JP | A-2004-287778 | 10/2004 |

OTHER PUBLICATIONS

Jan. 5, 2010 Refusing Reason Notice issued in Japanese Patent Application No. 2004-036666 (with translation).

* cited by examiner

DRIVER MANAGEMENT METHOD, DRIVER MANAGEMENT APPARATUS, AND DRIVER MANAGEMENT PROGRAM

The entire disclosure of Japanese patent application no. 2004-025483 filed on Feb. 2, 2004, and Japanese patent application no. 2004-036666 filed on Feb. 13, 2004 including specification, claims, drawings and abstract is incorporated herein by reference in its entirety.

FIELD OF THE INVENTION

The present invention relates to a driver management method, a driver management apparatus, and a driver management program, and particularly, to a driver management method, a driver management apparatus, and a driver management program for managing the drivers corresponding to devices connected to a network.

BACKGROUND OF THE INVENTION

In recent years, with the network communications becoming popularized, a variety of devices, such as printers, facsimiles, and scanners, have been made network compatible, and the opportunities of using these devices by a plurality of users through the network have been increasing.

When a device, such as a printer, is to be used by a personal computer (hereafter abbreviated as PC), the driver corresponding to the device to be used must be installed in the PC.

To install the driver, the device must be selected, and the driver for the selected device and the setting information, such as the address, must be acquired. This is troublesome not only for users who are not familiar with the operations of a PC, but also users who are familiar with such operations.

Therefore, some network systems are configured such that the driver distribution information is written in the domain server to be accessed at the time of logging in as a log-in script, so that the driver is installed when each PC is logged in the network. Further, there is another technology in which, when a PC enters the radio communication area for a wireless LAN (Local Area Network), the PC is allowed to communicate with the radio access point, and the driver is distributed from the access point to the PC (as disclosed in Japanese patent application publication No. 2002-259089, for example).

When a device, such as a printer, is to be used by a PC or the like, the driver corresponding to the device to be used must be installed in the PC. On such occasions, unless the user knows when such a device was installed and when it became available, the user cannot install the driver in the PC. Therefore, when the device was installed, the manager had to take a procedure to notify each user of the installation of the device and the information regarding the device.

There has been a technology for facilitating the above procedure, in which the server receives the printer identifier from a newly added network printer, generates an executable install program by using the printer identifier, and transmits the install program to the client processor. The client processor installs the executable install program (as disclosed in Japanese patent application publication No. 2000-215128, for example).

As stated above, the user must install the driver before using a printer or other device, and the processing for installing the driver is troublesome. In addition, the technology for installing the driver could demonstrate its advantageous utility only under such special conditions as that given when a radio LAN is used, or when a specific network system is employed as disclosed in Japanese patent application publication No. 2002-259089.

Further, with the technology as disclosed in Japanese patent application publication No. 2000-215128, the driver for a printer or the like is distributed also to the users who do not wish to use a device pertinent to that driver for such a reason as the installation-location of the device is remote. For such users, the distribution of the driver might have been a trouble.

SUMMARY OF THE INVENTION

The present invention has been made in view of the above circumstances and provides a driver management method, a driver management apparatus, and a driver management program for allowing any particular device connected to a network to be used without the need for the user considering the installation of the driver.

Further, the present invention has been made in view of the above circumstances, and provides a driver management method, a driver management apparatus, and a driver management program for allowing constructing a system which distributes the driver for a newly connected device only to the appropriate users without the need for the user or the manager making a troublesome operation.

In the present invention, a driver management method which manages drivers corresponding to devices connected to a network, comprises detecting devices connected to a subnet of the network; and presenting to a user drivers corresponding to the devices connected to the subnet, of drivers installed in a user terminal.

According to the present invention, the devices connected to a particular subnet of the network is detected, and the drivers corresponding to the devices connected to the subnet to user, of the drivers installed in a user terminal is presented.

Further, a device newly connected to the network is detected; device information from the detected device is acquired; the acquired device information is compared with the terminal information for the user terminals that is previously acquired or inputted; and on the result of the comparison, the user terminals to which the drivers are to be distributed is determined.

BRIEF DESCRIPTION OF THE DRAWINGS

Embodiments of the present invention will be described in detail based on the following figures, wherein.

DESCRIPTION OF THE PREFERRED EMBODIMENTS

Embodiments of the driver management method, the driver management apparatus, and the driver management program according to the present invention will be described with reference to the accompanying drawings.

Embodiment 1

Figure 1:
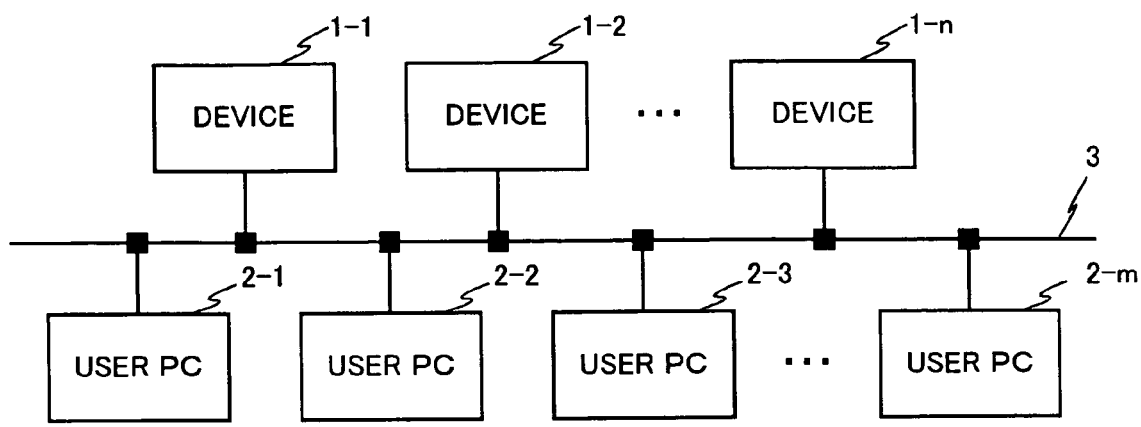
FIG. 1 is a diagram illustrating an example of configuration of the network comprising user PCs to which the present invention is applied.

FIG. 1 is a diagram illustrating an example of configuration of the network comprising user PCs to which the present invention is applied. In the configuration as illustrated in FIG. 1, a plurality of devices 1 (1-1 to 1-*n*) and a plurality of user PCs 2 (2-1 to 2-*m*) are connected to one another through a network 3.

The devices 1 (1-1 to 1-*n*) are such a device as a printer or a facsimile, which must use a driver for the devices to be operable. The user PCs 2 (2-1 to 2-*m*) are personal computers for use by respective users. The devices 1 are used by the user PCs 2. The present invention is applied to the user PCs 2.

Figure 2:
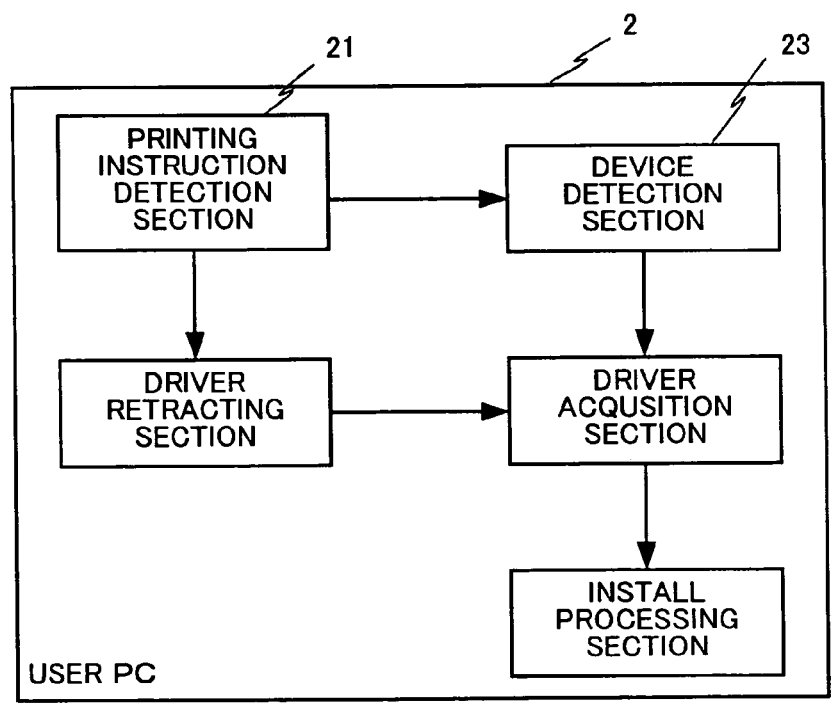
FIG. 2 is a block diagram illustrating the functional configuration of the user PC 2.

FIG. 2 is a block diagram illustrating the functional configuration of the user PC 2. As shown in FIG. 2, the user PC 2 comprises a printing instruction detection section 21, a driver retracting section 22, a device detection section 23, a driver acquisition section 24, and an install processing section 25. The printing instruction detection section 21, the driver retracting section 22, the device detection section 23, the driver acquisition section 24, and the install processing section 25 are each implemented by operating the user PC 2 on the basis of the program.

The printing instruction detection section 21 detects that a printing instruction, such as an instruction for displaying a printing menu, has been issued from an application software (not shown) or the like which the user runs on the PC 2. When the printing instruction detection section 21 detects a printing instruction, the driver retracting section 22 retracts the drivers for the devices 1 which are connected to the subnets of the network 3 other than the subnet to which the user PC 2 is currently connected. The device detection section 23 detects the devices 1 connected to the subnet of the network 3 to which the user PC 2 is currently connected. The driver acquisition section 24 acquires the driver corresponding to a device 1 for which the corresponding driver is not installed, of the devices 1 which were detected by the device detection section 23. The driver to be acquired includes information regarding the driver which was retracted by the driver retracting section 22, in addition to the driver itself. The install processing section 25 carries out installation of the driver which was acquired by the driver acquisition section 24, and restoration processing of the driver on the basis of the information regarding the retracted driver that was acquired by the driver acquisition section 24.

Figure 3:
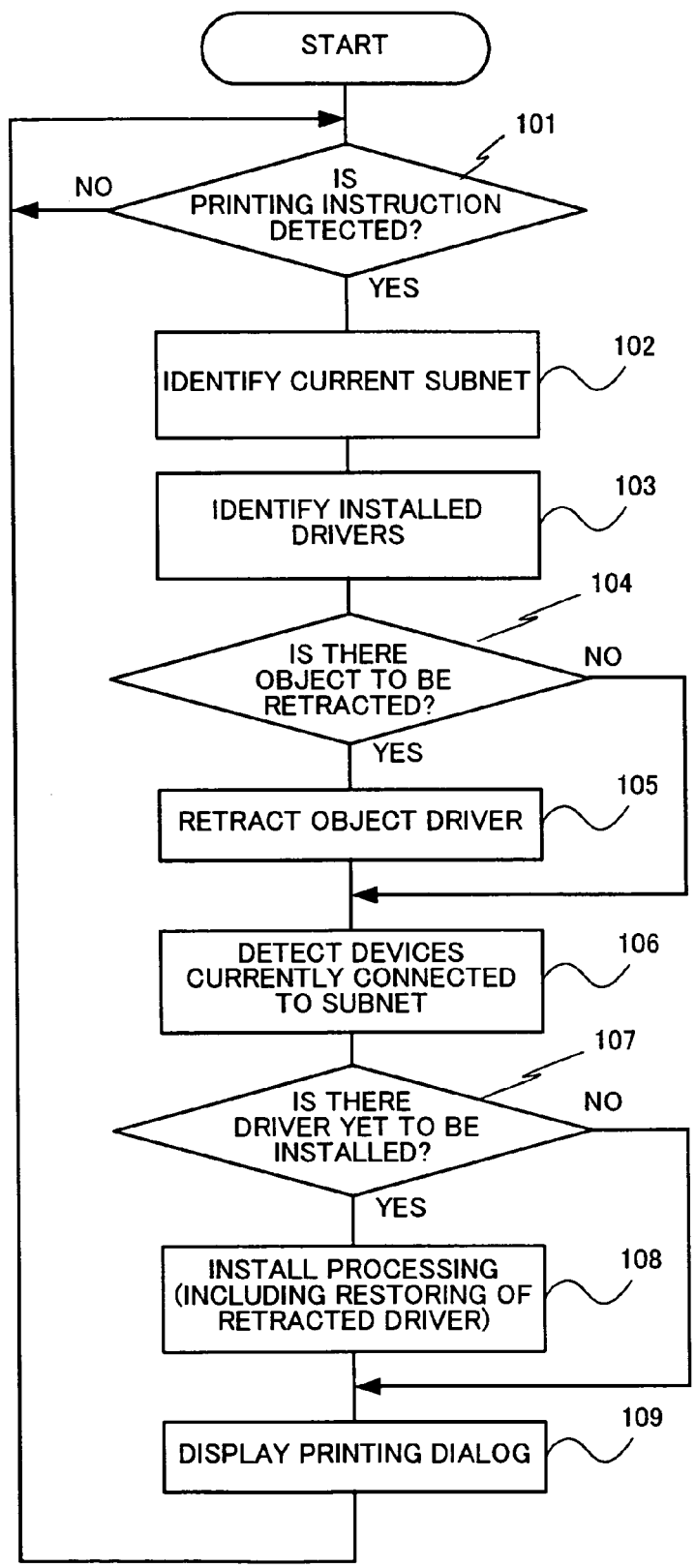
FIG. 3 is a flow chart illustrating the flow of operations of the user PC 2.

Here, the operations of the user PC 2 will be described. FIG. 3 is a flow chart illustrating the flow of operations of the user PC 2.

When the printing instruction detection section 21 detects a printing instruction by the user (YES at step 101), the driver retracting section 22 identifies the subnet of the network 3 to which the user PC 2 is currently connected (at step 102), and identifies the drivers which are installed in the user PC 2 (at step 103). Then, when a driver to be retracted, i.e., the driver corresponding to a device 1 which is connected to a subnet of the network 3 other than the subnet to which the user PC 2 is connected is installed (YES at step 104), the driver retracting section 22 retracts the pertinent driver (at step 105).

Retraction of a driver by the driver retracting section 22 is carried out by moving all the files and pieces of information related to the driver to a desired location (such as in the storage medium in the hard disk) to cause the OS (operating system) in the user PC 2 to recognize that the driver has been uninstalled. Only the minimum number of files and pieces of information that are required for the OS to recognize that the driver is installed, rather than all the files and pieces of information related to the driver, may be moved to a desired location. Alternatively, the retraction of a driver may be carried out by backing up and then unstalling the driver. When the driver retraction is ended, or no drivers to be retracted are installed (NO at step 104), the device detection section 23 detects the devices 1 connected to the subnet to which the user PC 2 is currently connected (at step 106).

As a result of this, when a device 1 the corresponding driver for which is not installed in the user PC 2 is detected (YES at step 107), the driver acquisition section 24 acquires the pertinent driver, and the install processing section 25 installs the pertinent driver (at step 108). In this case, the driver acquisition section 24 acquires the driver from the previously designated server (not shown) or the like, and in addition to this, when a driver which was retracted by the driver retracting section 22 in the past is to be installed, the driver acquisition section 24 acquires information regarding the retracting destination and the like. And, the install processing section 25 carries out normal install processing for a newly acquired driver, and for a retracted driver, the install processing section 25 carries out restoration processing thereof.

Then, the user PC 2 displays a printing dialog on a display apparatus (not shown) or the like (at step 109), waiting for a next printing instruction. The results of user instruction on the printing dialog are processed by the OS or the like in the same manner as conventional.

In the flow of operations as shown in FIG. 3, the detection of a printing instruction is again waited for after the printing dialog being displayed. Alternatively, since the series of operations as illustrated in FIG. 3 is not needed to be repetitively carried out as long as the configuration of the network 3 to which the user PC 2 is connected is not changed, the series of operations may be performed only once after the user PC 2 is turned on, restarted, or connected to the network, for example.

Next, the contents of the indications as given on the printing dialog as a result of the series of operations as shown in FIG. 3 will be described. Here, it is assumed that the network 3 is configured as shown in FIG. 4.

Figure 4:
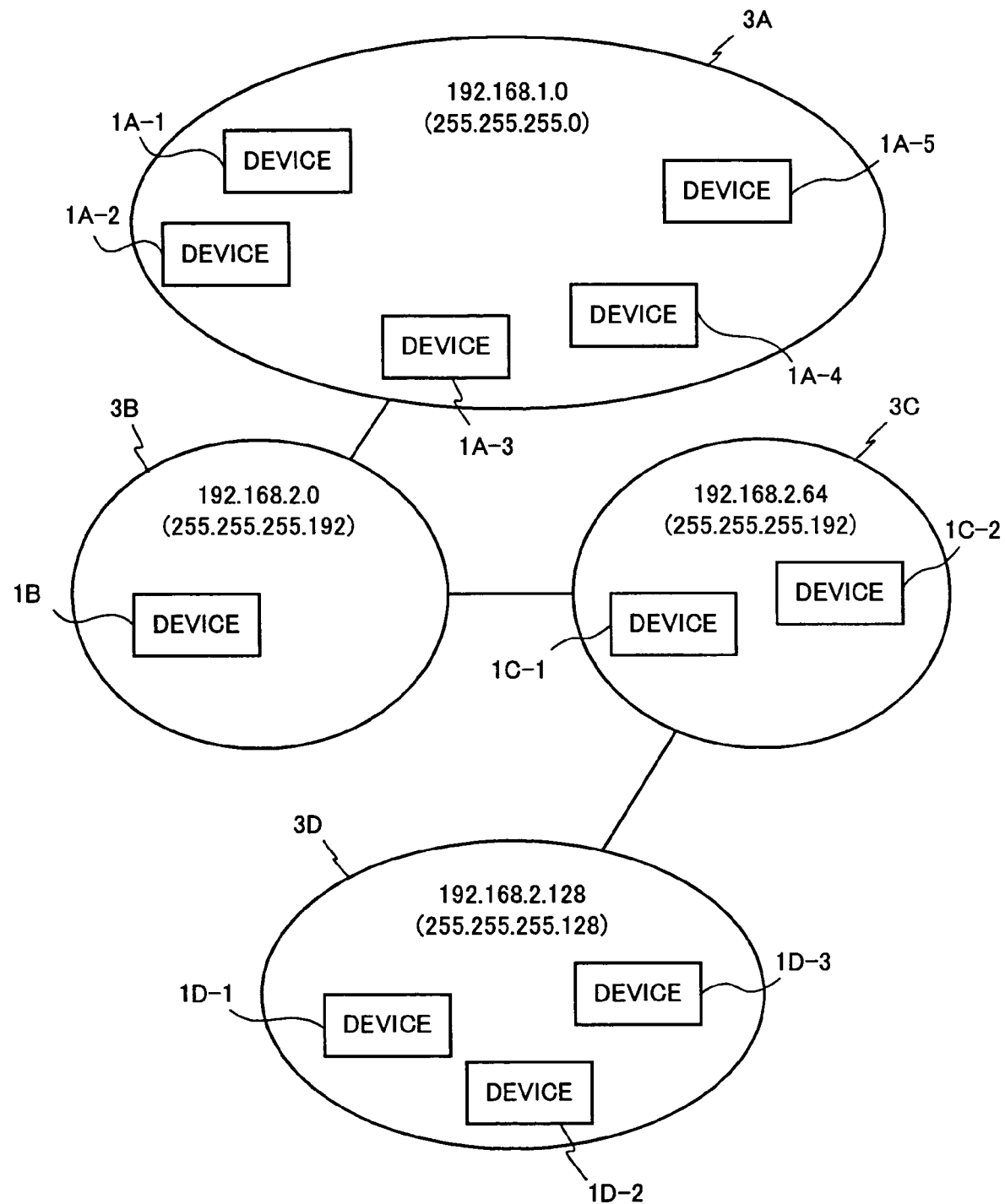
FIG. 4 is a diagram illustrating an example of configuration of the network 3.

As shown in FIG. 4, the network 3 comprises a subnet 3A, a subnet 3B, a subnet 3C, and a subnet 3D.

The subnet 3A is a network which network address is "192.168.1.0/24", i.e., a network which usable addresses range from "192.168.1.0" to "192.168.1.255". Likewise, the subnet 3B has a network address of "192.168.2.0/26" (usable addresses ranging from "192.168.2.0" to "192.168.2.63"), the subnet 3C has a network address of "192.168.2.64/26" (usable addresses ranging from "192.168.2.64" to "192.168.2.127"), and the subnet 3D has a network address of "192.168.2.128/25" (usable addresses ranging from "192.168.2.128" to "192.168.2.255").

To the subnet 3A are connected a device 1A-1, a device 1A-2, a device 1A-3, a device 1A-4, and a device 1A-S; to the subnet 3B is connected a device 1B; to the subnet 3C are connected a device 1C-1, and a device 1C-2; and to the subnet 3D are connected a device 1D-1, a device 1D-2, and a device 1D-3.

Figure 5A:
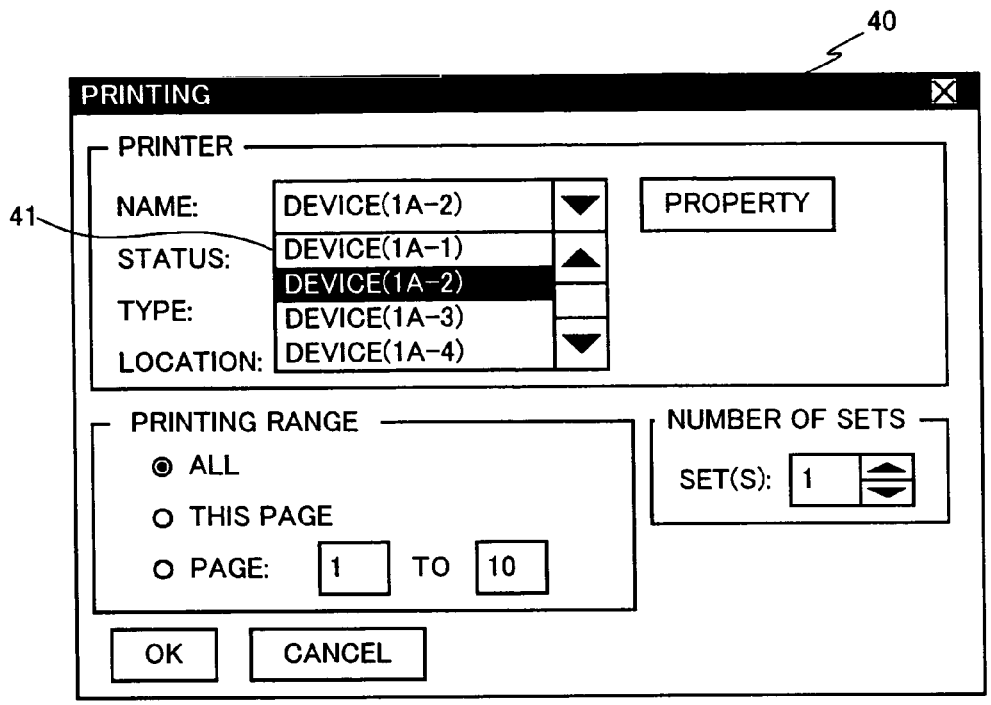
FIG. 5A and FIG. 5B illustrate examples of display screen for the printing dialog.

In such a network configuration, when the user PC 2 is connected to the subnet 3A, the printing dialog will be that as shown in FIG. 5A. In the printer selection column 41 in the printing dialog 40 as shown in FIG. 5A, the device 1A-1, the device 1A-2, the device 1A-3, the device 1A-4, and the device 1A-5, which are connected to the subnet 3A, are indicated as options.

Figure 5B:
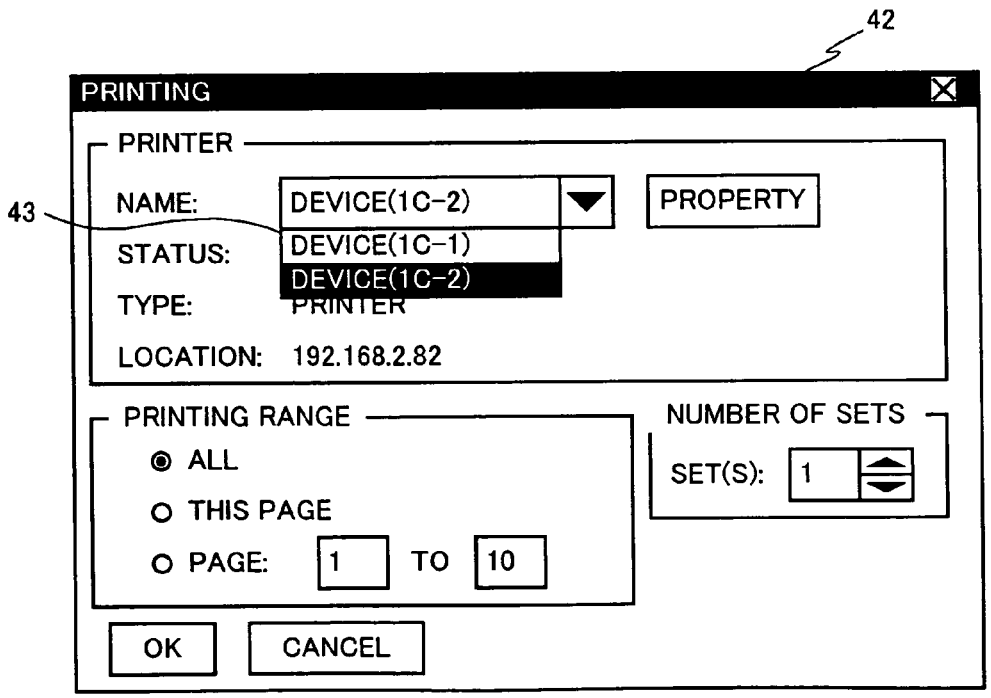

When the user PC 2 is connected to the subnet 3C, the printing dialog displayed will be that as shown in FIG. 5B. In the printer selection column 43 in the printing dialog 42 as shown in FIG. 5B, the device 1C-1 and the device 1C-2, which are connected to the subnet 3C, are indicated as options.

Although the illustration is omitted in the drawings, when the user PC 2 is connected to the subnet 3B, the device 1B is indicated in the printer selection column on the printing dialog, and when the user PC 2 is connected to the subnet 3D, the device 1D-1, the device 1D-2, and the device 1D-3 are indicated in the printer selection column on the printing dialog.

Embodiment 2

Next, an embodiment 2 will be described. In the embodiment 2, a user PC 202, which is equivalent to the user PC 2 in the embodiment 1, will be described. Since the configuration of the network to which the user PC 202 is connected is similar to the network 3 described in the embodiment 1, the embodiment 2 will be described with reference to FIG. 1 and the like.

Figure 6:
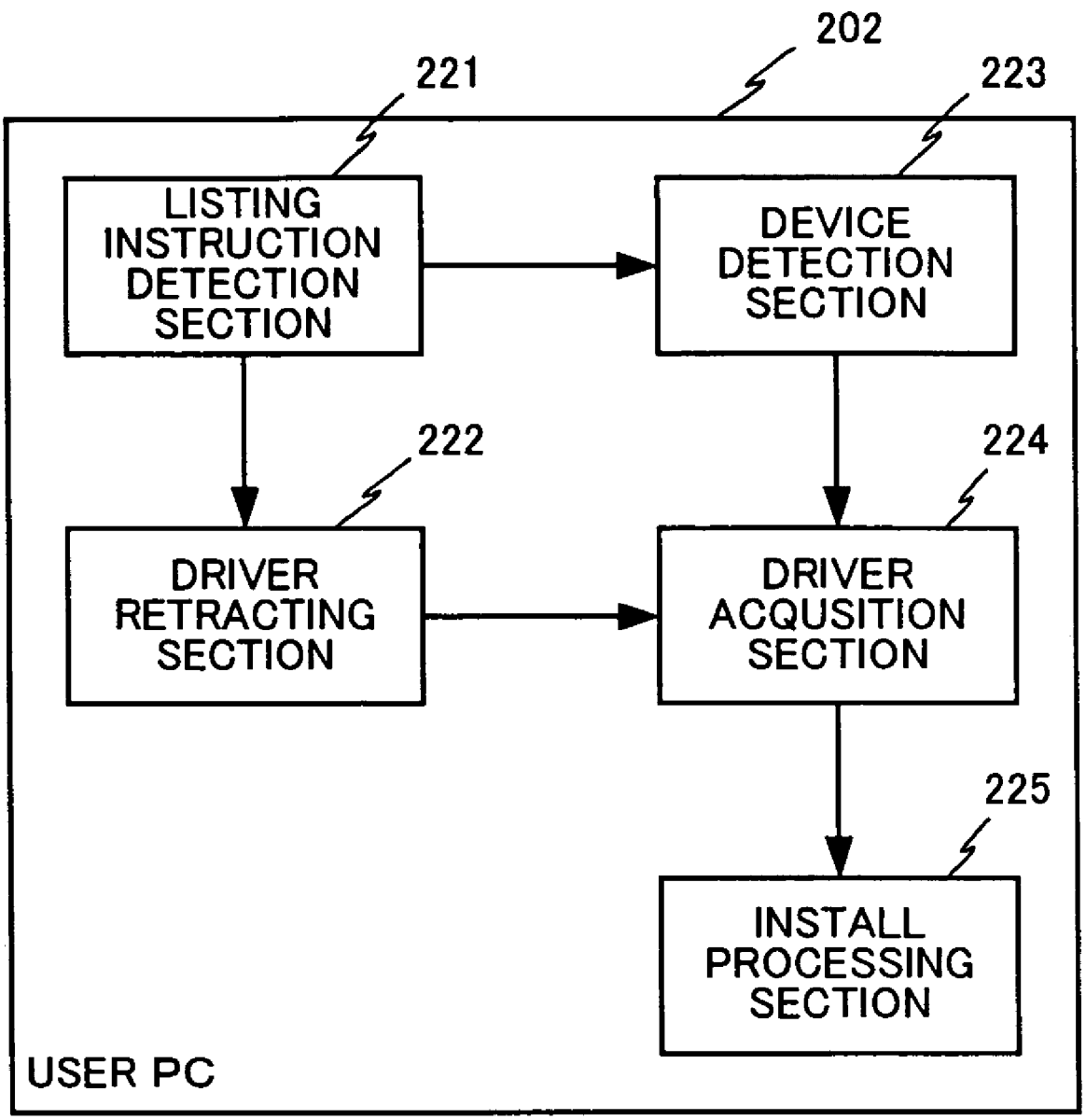
FIG. 6 is a block diagram illustrating the functional configuration of the user PC 202.

FIG. 6 is a block diagram illustrating the functional configuration of the user PC 202. As shown in FIG. 6, the user PC 202 comprises a listing instruction detection section 221, a driver retracting section 222, a device detection section 223, a driver acquisition section 224, and an install processing section 225. The listing instruction detection section 221, the driver retracting section 222, the device detection section 223, the driver acquisition section 224, and the install processing section 225 are each implemented by operating the user PC 202 on the basis of the program.

The listing instruction detection section 221 detects that a listing instruction has been issued through the operations of the OS which the user runs on the PC 202. When the listing instruction detection section 221 detects a listing instruction, the driver retracting section 222 retracts the drivers for the devices 1 which are connected to the subnets of the network 3 other than the subnet to which the user PC 202 is currently connected. The device detection section 223 detects the devices 1 connected to the subnet of the network 3 to which the user PC 202 is currently connected. The driver acquisition section 224 acquires the driver corresponding to a device 1 corresponding driver for which is not installed, of the devices 1 which were detected by the device detection section 223. The driver to be acquired includes information regarding the driver which was retracted by the driver retracting section 222, in addition to the driver itself. The install processing section 225 carries out installation of the driver which was acquired by the driver acquisition section 224, and restoration processing of the driver on the basis of the information regarding the retracted driver that was acquired by the driver acquisition section 224.

Figure 7:
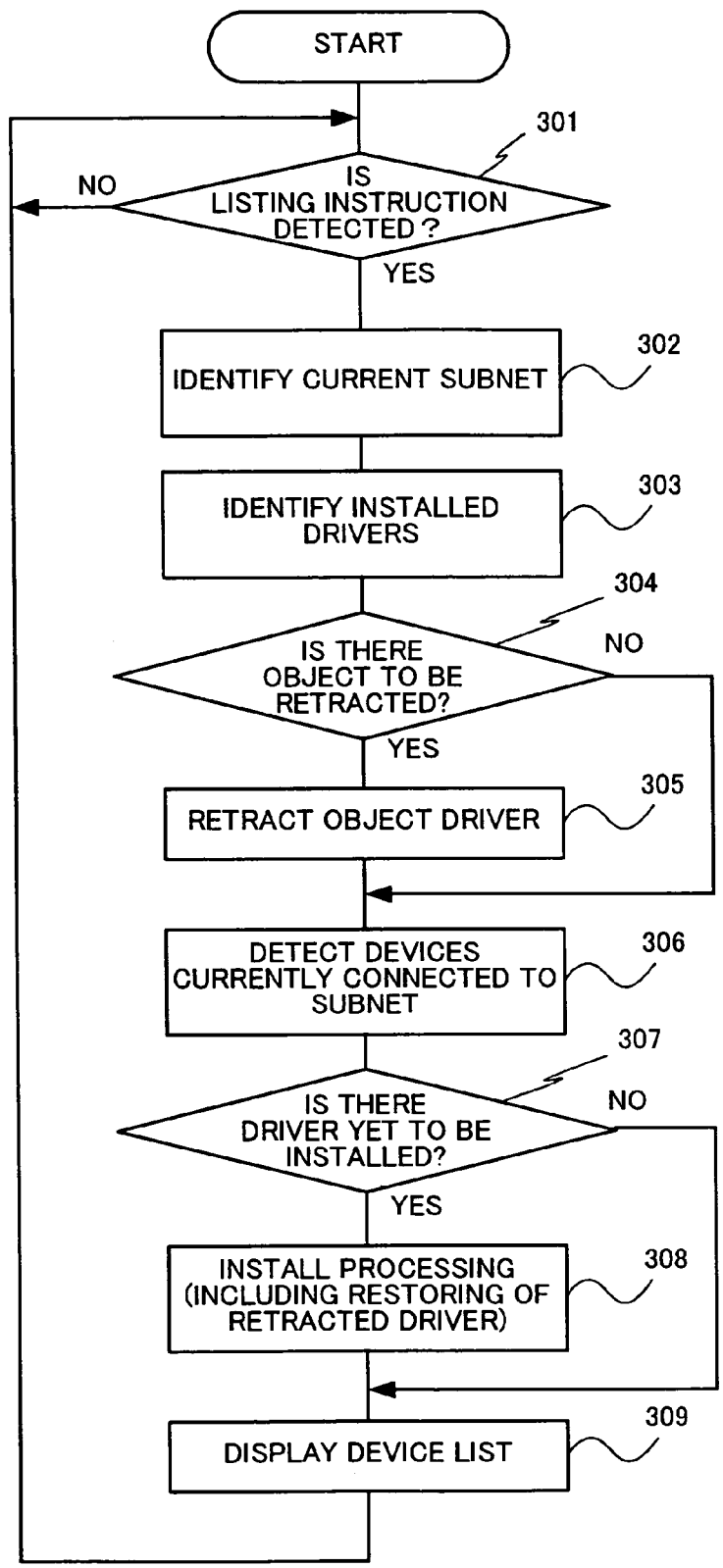
FIG. 7 is a flow chart illustrating the flow of operations of the user PC 202.

The operations of the user PC 202 will now be described. FIG. 7 is a flow chart illustrating the flow of operations of the user PC 202.

When the listing instruction detection section 221 detects a printing instruction by the user (YES at step 301), the driver retracting section 222 identifies the subnet of the network 3 to which the user PC 202 is currently connected (at step 302), and identifies the drivers which are installed in the user PC 202 (at step 303). Then, when a driver to be retracted, i.e., the driver corresponding to a device 1 which is connected to a subnet of the network 3 other than the subnet to which the user PC 2 is connected is installed (YES at step 304), the driver retracting section 222 retracts the pertinent driver (at step 305).

Retraction of a particular driver by the driver retracting section 222 is carried out by moving all the files and pieces of information related to the driver to a desired location (in the storage medium in the hard disk or the like) to cause the OS (operating system) in the user PC 202 to recognize that the driver has been uninstalled. Only the minimum number of files and pieces of information that are required for the OS to recognize that the driver is installed, rather than all the files and pieces of information related to the driver, may be moved to a desired location, or the uninstall processing itself may be executed.

When the driver retraction is ended, or no drivers to be retracted are installed (NO at step 304), the device detection section 223 detects the devices 1 connected to the subnet to which the user PC 202 is currently connected (at step 306).

As a result of this, when a device 1 the corresponding driver for which is not installed in the user PC 202 is detected (YES at step 307), the driver acquisition section 224 acquires the pertinent driver, and the install processing section 225 installs the pertinent driver (at step 308). In this case, the driver acquisition section 224 acquires the driver from the previously designated server (not shown) or the like, and in addition to this, when a driver which was retracted by the driver retracting section 222 in the past is to be installed, the driver acquisition section 224 acquires information regarding the retracting destination and the like. Then, the install processing section 225 carries out normal install processing for a newly acquired driver, and the install processing section 225 carries out restoration processing for a retracted driver.

Thereafter, the user PC 202 displays a device (printer) list on a display apparatus (not shown) or the like (at step 309), waiting for a next listing instruction.

In the flow of operations as shown in FIG. 7, the detection of a listing instruction is again waited for after the device list being displayed. Alternatively, since the series of operations as illustrated in FIG. 7 is not needed to be repetitively carried out as long as the configuration of the network 3 to which the user PC 202 is connected is not changed, the series of operations may be performed only once after the user PC 202 is turned on, restarted, or connected to the network, for example.

Next, the contents of the indications as given on the device list as a result of the series of operations as shown in FIG. 3 will be described. Here, it is assumed that the network 3 is configured as shown in FIG. 4 as in the embodiment 1.

Figure 8A:
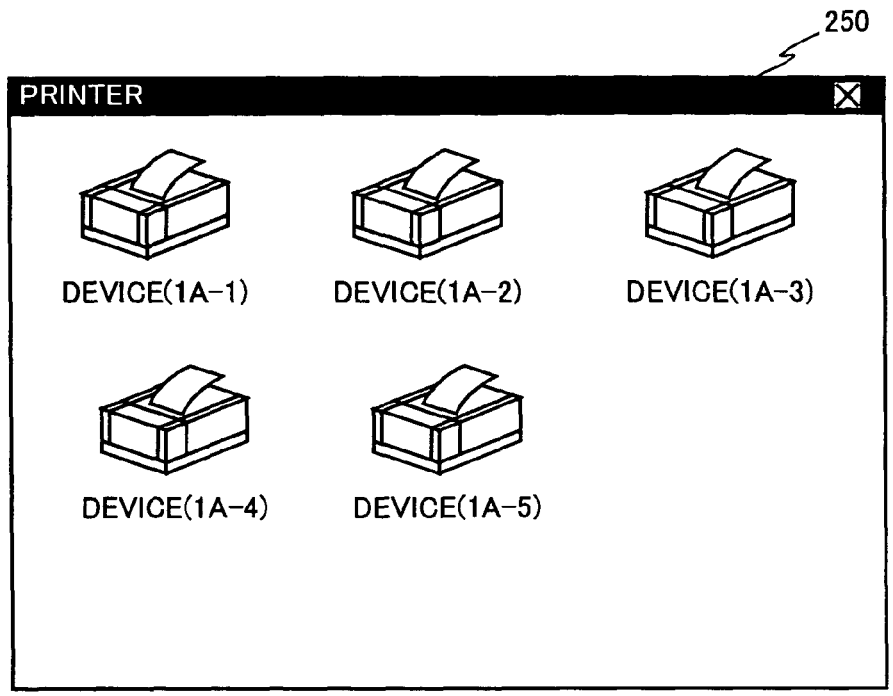
FIG. 8A and FIG. 8B illustrate examples of display screen for the list, respectively.

In a network configuration as shown in FIG. 4, when the user PC 202 is connected to a subnet 3A, the device list displayed will be that as shown in FIG. 8A. In the list display screen 250 as shown in FIG. 8A, a device 1A-1, a device 1A-2, a device 1A-3, a device 1A-4, and a device 1A-5, which are connected to the subnet 3A, are indicated.

Figure 8B:
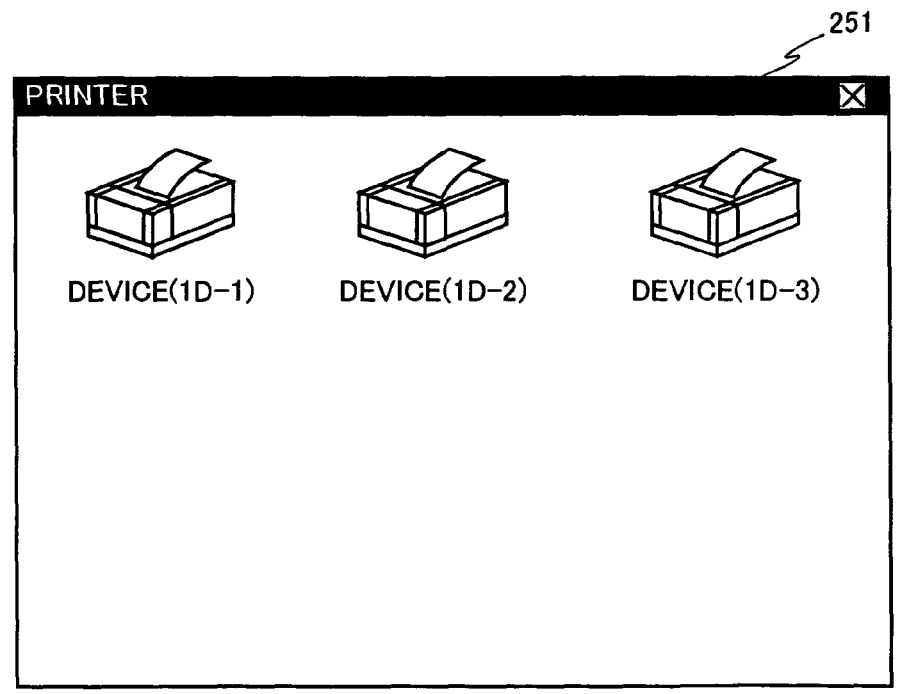

When the user PC 202 is connected to a subnet 3D, the device list displayed will be that as shown in FIG. 8B. In the list display screen 251 as shown in FIG. 8B, a device 1D-1, a device 1D-2, and a device 1D-3, which are connected to the subnet 3D, are indicated.

Although the illustration is omitted, when the user PC 202 is connected to a subnet 3B, a device 1B is indicated in the list display screen, and when the user PC 202 is connected to a subnet 3C, the device 1C-1 and a device 1C-2 are indicated in the list display screen.

Embodiment 3

Next, an embodiment 3 will be described. In the embodiment 3, a user PC 402, which is equivalent to the user PC 2 in the embodiment 1, will be described. Since the configuration of the network to which the user PC 402 is connected is similar to the network 3 described in the embodiment 1, the embodiment 3 will be described with reference to FIG. 1 and the like.

Figure 9:
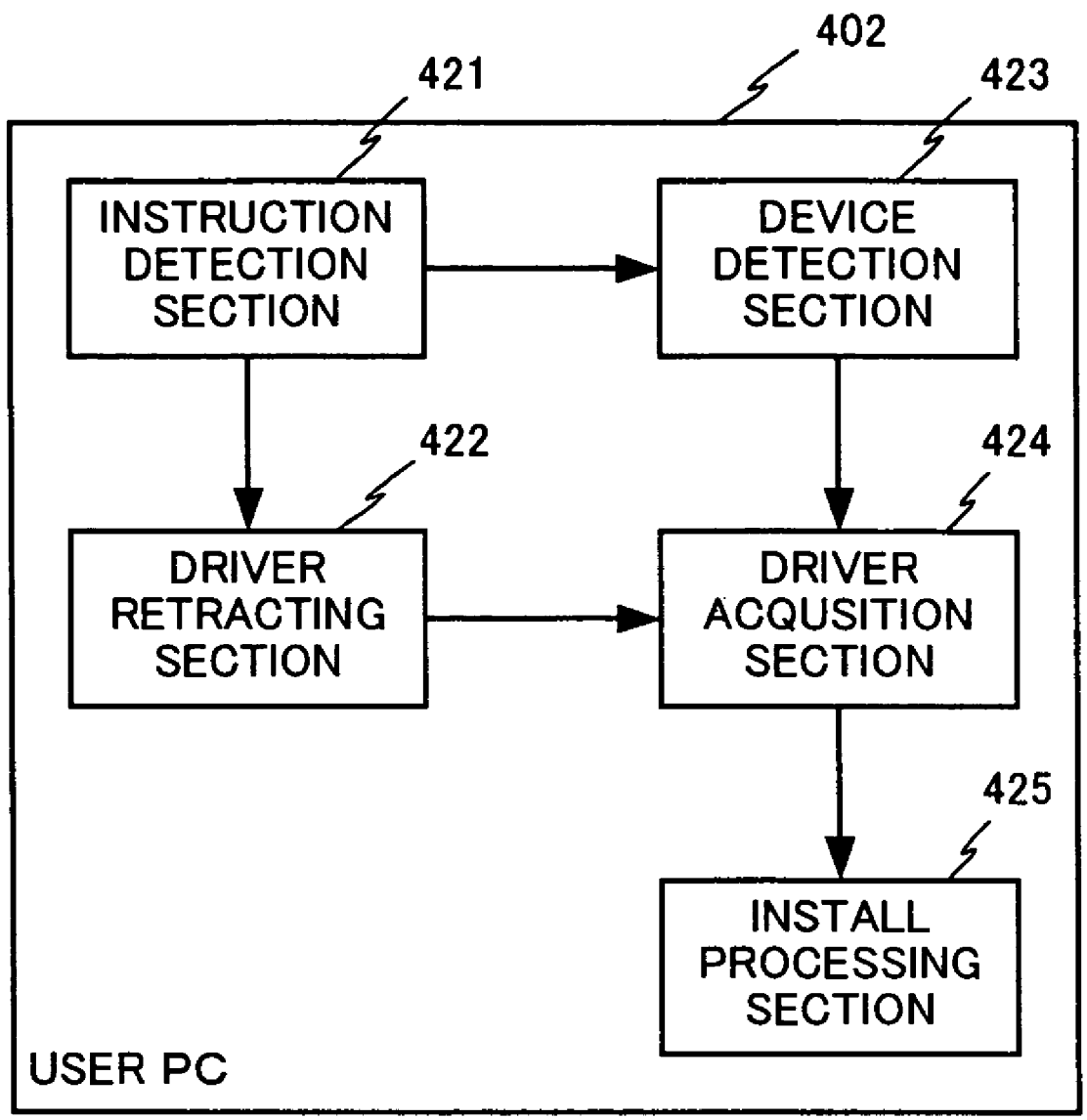
FIG. 9 is a block diagram illustrating the functional configuration of the user PC of still another embodiment.

FIG. 9 is a block diagram illustrating the functional configuration of the user PC 402. As shown in FIG. 9, the user PC 402 comprises an instruction detection section 421, a driver retracting section 422, a device detection section 423, a driver acquisition section 424, and an install processing section 425. The instruction detection section 421, the driver retracting section 422, the device detection section 423, the driver acquisition section 424, and the install processing section 425 are each implemented by operating the user PC 402 on the basis of the program.

The instruction detection section 421 detects that a printing instruction, such as an instruction for displaying a printing menu, has been issued from application software (not shown) or the like which the user runs on the PC 402, and that a listing instruction has been issued through the operations of the OS which the user runs on the PC 402. When the instruction detection section 421 detects a listing instruction, the driver retracting section 422 retracts the drivers for the devices 1 which are connected to the subnets of the network 3 other than the subnet to which the user PC 402 is currently connected. The device detection section 423 detects the devices 1 connected to the subnet of the network 3 to which the user PC 402 is currently connected. The driver acquisition section 424 acquires the driver corresponding to a device 1 the corresponding driver for which is not installed, of the devices 1 which were detected by the device detection section 423. The driver to be acquired includes information regarding the driver which was retracted by the driver retracting section 422, in addition to the driver itself. The install processing section 425 carries out installation of the driver which was acquired by the driver acquisition section 424, and restoration processing of the driver on the basis of the information regarding the retracted driver that was acquired by the driver acquisition section 424.

This user PC 402 provides a configuration in which the instruction detection section 421 detects a printing instruction and a listing instruction, in other words, a configuration in which the user PC 2 in the embodiment 1 and the user PC 202 in the embodiment 2 are mixed with each other. As a result both the operations as illustrated in FIG. 3 and that as illustrated in FIG. 7 are performed. Thus, the description of the operations of the user PC 402 is omitted.

Embodiment 4

The embodiment 4 allows utilization of the devices connected to the subnets other than the subnet to which the user PC is currently connected, and the embodiment 4 can be combined with each of the above-mentioned embodiments 1 to 3. Here, the embodiment 4 will be described for the configuration of the embodiment 1.

Figure 10A:
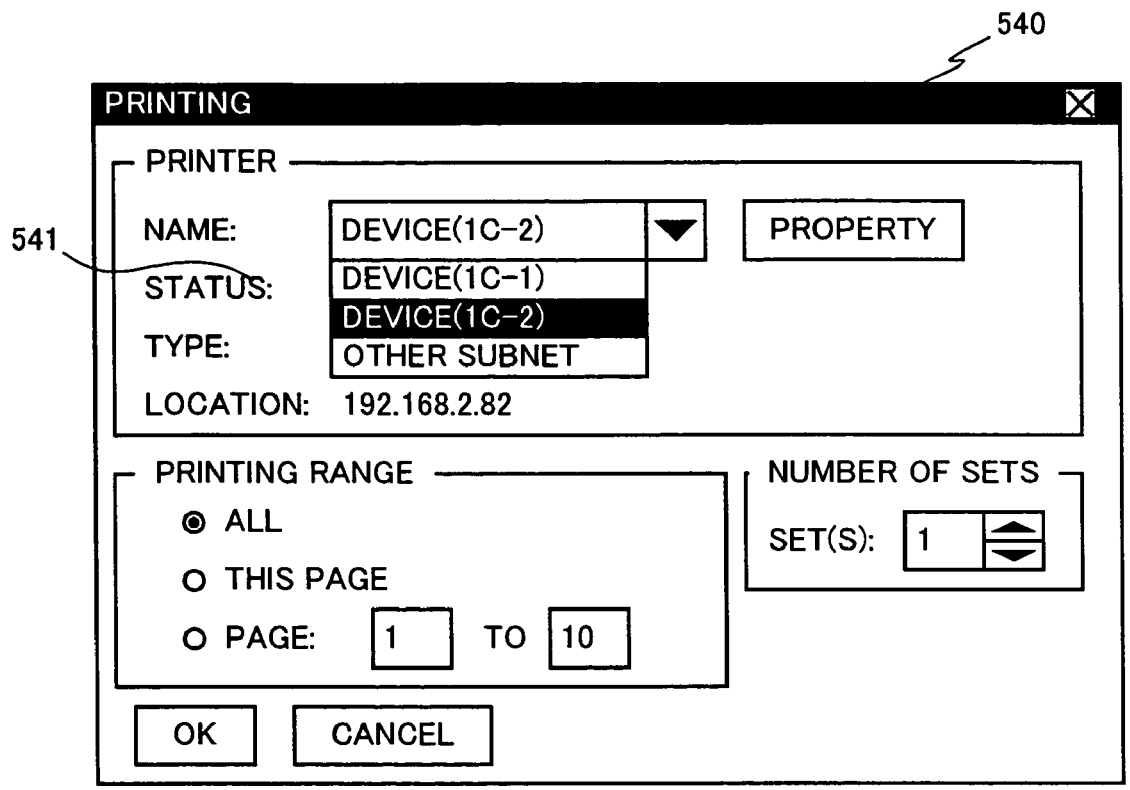
FIG. 10A and FIG. 10B illustrate an example of display screen for the printing dialog and an example of display screen for the subnet designation, respectively.

In the configuration of the embodiment 4, the user PC 2 displays a printing dialog as shown in FIG. 10A. In a printer selection column 541 in the printing dialog 540 as shown in FIG. 10A, "other subnet" is added to device 1C-1 and the like as an option.

Figure 10B:
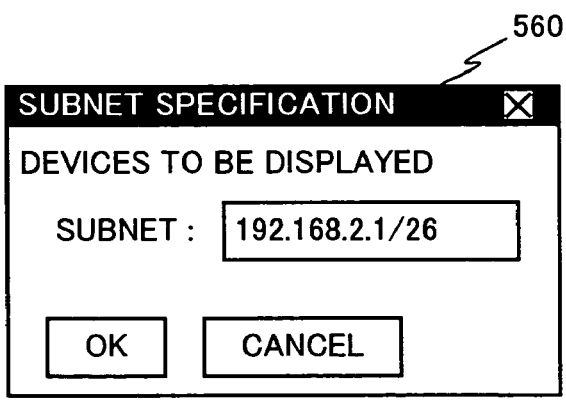

When the user selects this "other subnet", the display screen (not shown) in the user PC 2 displays a subnet designation screen 560 as shown in FIG. 10B. When the user designates a desired subnet on the subnet designation screen 560, the printing dialog is again displayed, and in the printer selection column in the printing dialog, the devices which are connected to the designated subnet are displayed as options.

Figure 11:
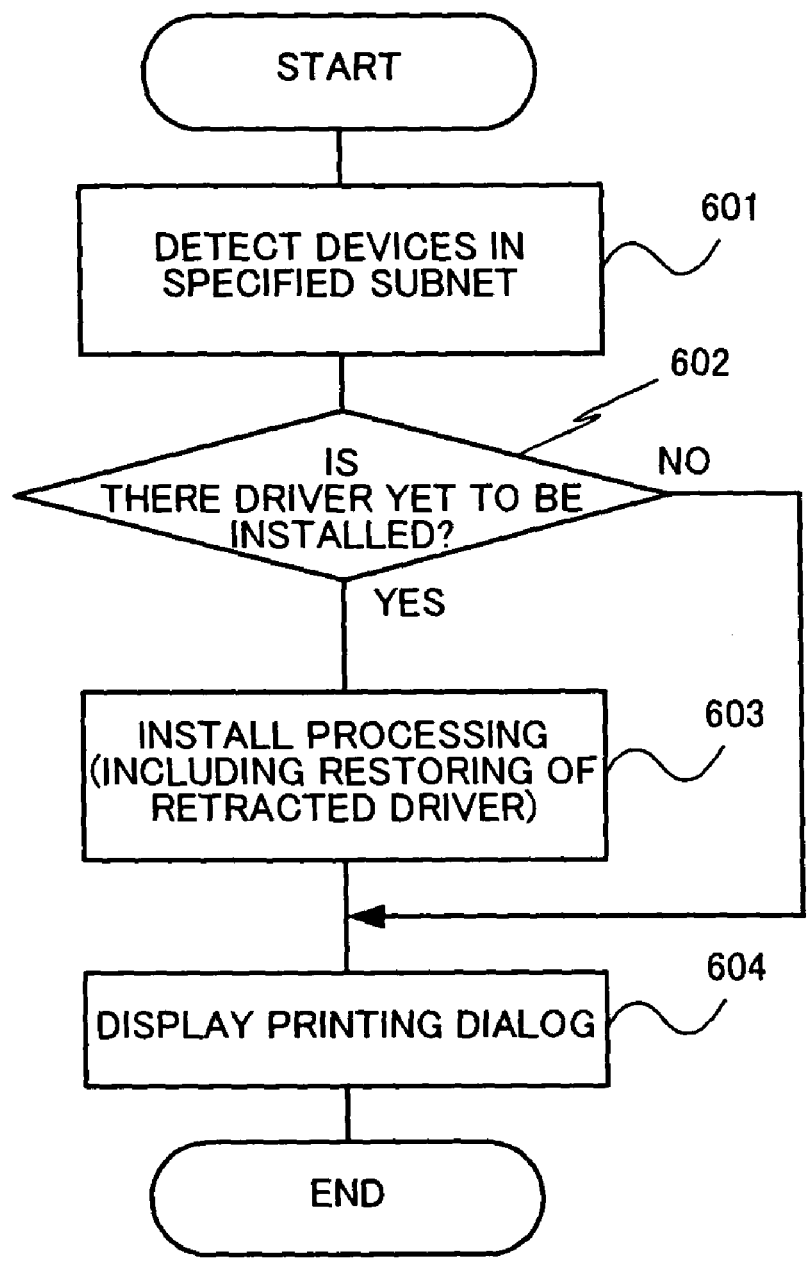
FIG. 11 is a flow chart illustrating the flow of operations of the user PC 2 when a subnet is designated on the subnet designation screen 560.

Now, the operations of the user PC 2 when a subnet is designated on the subnet designation screen 560 will be described. FIG. 11 is a flow chart illustrating the flow of operations of the user PC 2 when a subnet is designated on the subnet designation screen 560.

When a subnet is designated on the subnet designation screen 560, the device detection section 23 detects the devices 1 which are connected to the designated subnet (at step 601).

As a result, when a device 1 the corresponding driver for which is not installed in the user PC 2 is detected (YES at step 602), the driver acquisition section 24 acquires the pertinent driver, and the install processing section 25 installs the pertinent driver (at step 603). In this case, the driver acquisition section 24 acquires the driver from the previously designated server (not shown) or the like, and in addition to this, when a driver which was retracted by the driver retracting section 22 in the past is to be installed, the driver acquisition section 24 acquires information regarding the retracting destination and the like. Then, the install processing section 25 carries out normal install processing for a newly acquired driver, and the install processing section 25 carries out restoration processing for a retracted driver.

Thereafter, the user PC 2 displays a printing dialog on a display apparatus (not shown) or the like (at step 604), ending the operations.

The processing as illustrated in FIG. 11 only adds the drivers for the devices which are connected to the subnet designated by the user. The processing may be adapted such that the drivers of the devices which were already detected (the devices in the subnet to which the user PC 2 is currently connected) are retracted.

Embodiment 5

Figure 12:
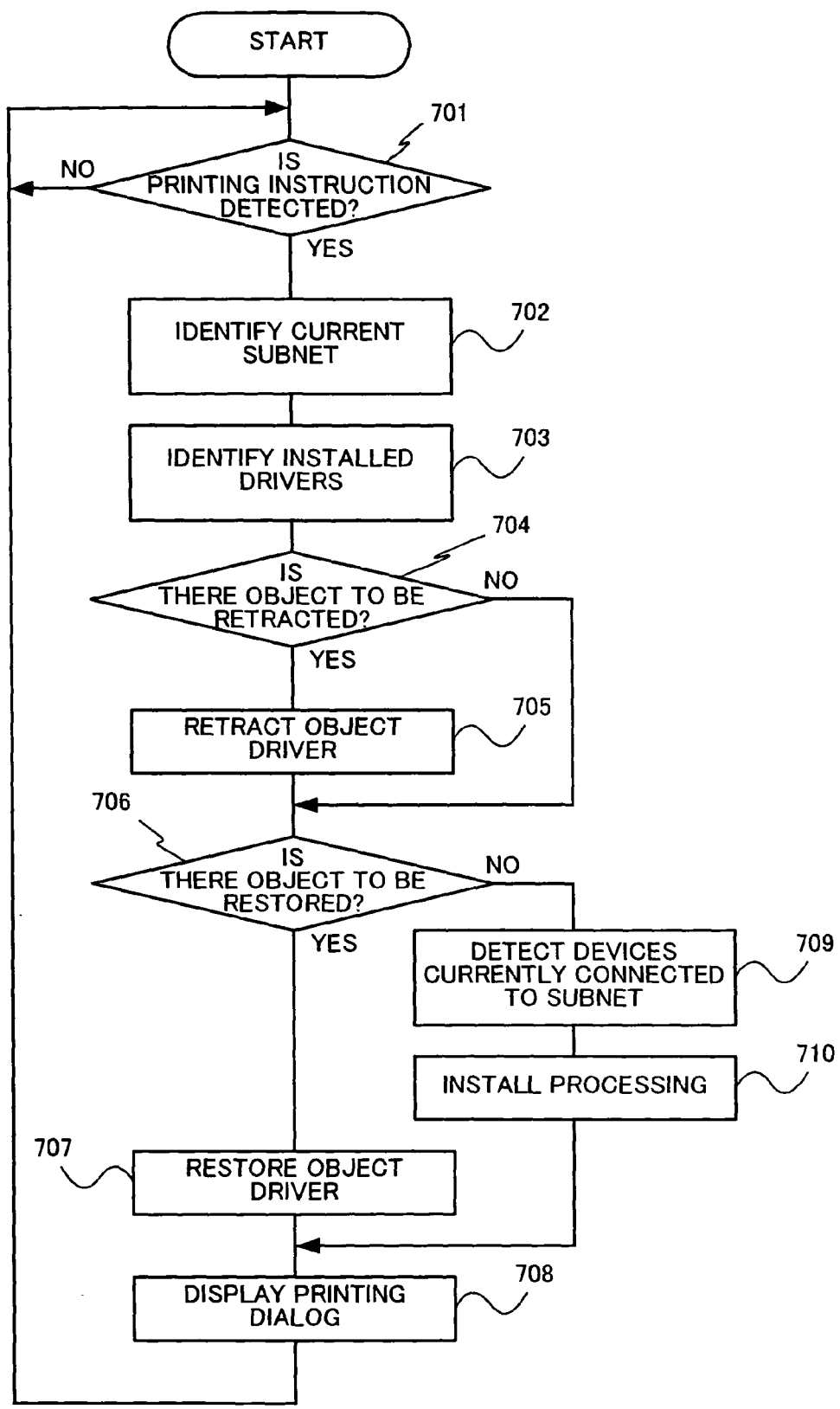
FIG. 12 is a flow chart illustrating the flow of operations of the user PC 2 in the embodiment 5.

The embodiment 5 provides an example in which, when the drivers corresponding to the devices in the subnet to which a user PC is currently connected are to be installed in the user PC, if one or more object drivers have been retracted, a new driver is not installed. The embodiment 5 can be used in combination with each of the embodiments 1 to 4. Here, however, the embodiment 5 will be described on the basis of the configuration of the embodiment 1. FIG. 12 is a flow chart illustrating the flow of operations of the user PC 2 in the embodiment 5.

When the printing instruction detection section 21 detects a printing instruction by the user (YES at step 701), the driver retracting section 22 identifies the subnet of the network 3 to which the user PC 2 is currently connected (at step 702), and identifies the drivers which are installed in the user PC 2 (at step 703). Then, when a driver to be retracted, i.e., the driver corresponding to a device 1 which is connected to a subnet of the network 3 other than the subnet to which the user PC 2 is connected is installed (YES at step 704), the driver retracting section 22 retracts the pertinent driver (at step 705).

When the driver retraction is ended, or no drivers to be retracted are installed (NO at step 704), the driver retracting section 22 identifies the retracted drivers. If a driver which is to be restored is found (YES at step 706) as a result of the identification, the driver acquisition section 24 acquires information regarding the retracting destination and the like for the pertinent driver, and the install processing section 25 carries out restoration processing of the retracted driver (at step 707). Then, the user PC 2 displays a printing dialog on a display apparatus (not shown) or the like (at step 708), waiting for a next printing instruction.

On the other hand, if no drivers which are to be restored are found (NO at step 706) as a result of the identification of the retracted drivers by the driver retracting section 22, the device detection section 23 detects the devices 1 connected to the subnet to which the user PC 2 is currently connected (at step 709). If a device 1 the corresponding driver for which is not installed in the user PC 2 is detected, the driver acquisition section 24 acquires the pertinent driver, and the install processing section 25 installs the pertinent driver (at step 710). Then, the user PC 2 displays a printing dialog on a display apparatus (not shown) or the like (at step 708), waiting for a next printing instruction.

In the flow of operations as shown in FIG. 12, the detection of a printing instruction is again waited for after the printing dialog being displayed, however, since the series of operations as illustrated in FIG. 12 is not needed to be repetitively carried out as long as the configuration of the network 3 to which the user PC 2 is connected is not changed, the series of operations may be performed only once after the user PC 2 is turned on, restarted, or connected to the network, for example.

Embodiment 6

Figure 13:
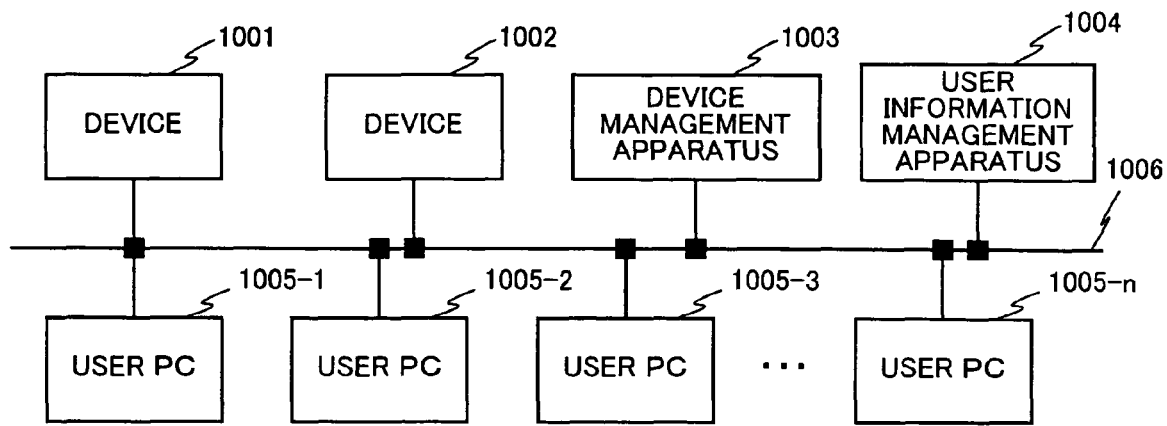
FIG. 13 is a diagram illustrating an example of configuration of the network in the embodiment 6.

FIG. 13 is a diagram illustrating an example of configuration of the network in the embodiment 6. In the configuration as illustrated in FIG. 13, a device 1001, a device 1002, a device management apparatus 1003, a user information management apparatus 1004, and a plurality of user PCs 1005 (1005-1 to 1005-n) are connected to one another through a network 1006.

The device 1001 and the device 1002 are a device, such as a printer, respectively, and which must use a driver for the devices to be operable. Here, it is assumed that the device 1001 is a newly installed one, and the device 1002 is an already installed one.

The device management apparatus 1003 is an apparatus to which the present invention is applied, and which supplies a driver for the user PC 1005, for example.

The user information management apparatus 1004 is an apparatus, such as a directory server, which manages user information. The user information managed by this user information management apparatus 1004 is capable of being acquired by using the LDAP (lightweight directory access protocol) or the like. The user information management apparatus 1004 is not an apparatus which is always necessary.

User PCs 1005-1 to 1005-n are a PC which is used by the user of the device 1001 or the device 1002, respectively.

Figure 14:
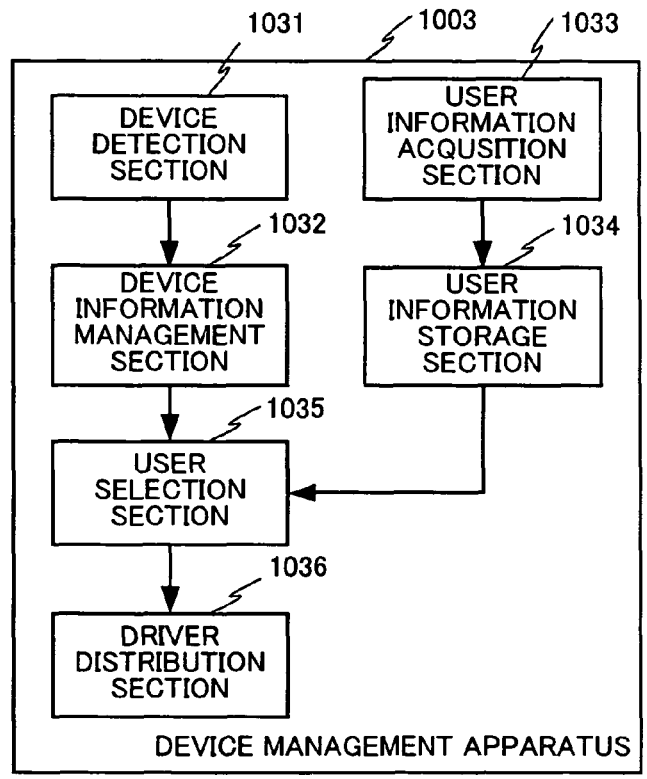
FIG. 14 is a block diagram illustrating the functional configuration of the device management apparatus 1003.

Now, the device management apparatus 1003 will be described. FIG. 14 is a block diagram illustrating the functional configuration of the device management apparatus 1003.

Referring to FIG. 14, the device management apparatus 1003 comprises a device detection section 1031, a device information management section 1032, a user information acquisition section 1033, a user information storage section 1034, a user selection section 1035, and a driver distribution section 1036. The device detection section 1031, the device information management section 1032, the user information acquisition section 1033, the user information storage section 1034, the user selection section 1035, and the driver distribution section 1036 are each implemented by operating the device management apparatus 1003, which is a server computer, on the basis of the program.

The device detection section 1031 detects the devices connected to the network 1006, and when a newly installed device (device 1001, for example) is detected, the device information for the pertinent device is acquired, and the device information acquired is passed to the device information management section 1032. The device detection section 1031 acquires the driver corresponding to the detected device 1001 through the device management apparatus 1003 (a portion not shown) or a server (not shown) connected to the network 1006, a server (not shown) connected to another network which is connectable through the network 1006, or the like, and passes it to the device information management section 1032. The device information management section 1032 manages the device information and the driver which were acquired by the device detection section 1031.

The device information includes the address of the pertinent device (the network address, such as the IP address), the information regarding the type of the device and the installation location, and the like, including at least the address. Detection of a device by the device detection section 1031 is carried out by means of transmitting from the pertinent device or by making periodical poling. Whether the detected device is a newly installed device or not is determined by examining whether or not the address of the detected device is that which is already managed by the device information management section 1032.

The user information acquisition section 1033 acquires the user information regarding the users who utilize the network 1006. When the user information management apparatus 1004 is connected to the network 1006, the user information is acquired from the user information management apparatus 1004. When the user information management apparatus 1004 is not connected, the user information which was inputted by the manager or the like is acquired. When the device is already installed in the network 1006, and the user information registered in the pertinent device (device 1002, for example) is capable of being acquired, that user information may be acquired. The acquired user information is stored in the user information storage section 1034. The user information storage section 1034 stores the user information acquired by the user information acquisition section 1033, managing it.

The user selection section 1035 compares the device information managed by the device information management section 1032 with the user information stored in the user information storage section 1034. From the result of comparison, the users to whom the driver corresponding to the device 1001 which was newly detected is to be distributed are selected. The users to whom the driver is to be distributed are selected on the basis of the installation locations for the user terminals 1005 used by the users, and the device 1001, and the like. The specific selection method will be described later.

The driver distribution section 1036 distributes the driver to the user terminals 1005 which are used by the users selected by the user selection section 1035. In this case, the pertinent driver is distributed in the format which incorporates the device information and the like necessary for install, for example, as a file in the execute form (installer). The distribution method used may be that as stated in Japanese patent application publication No. 2000-215128, or E-mail may be used for distribution to the selected users.

Figure 15:
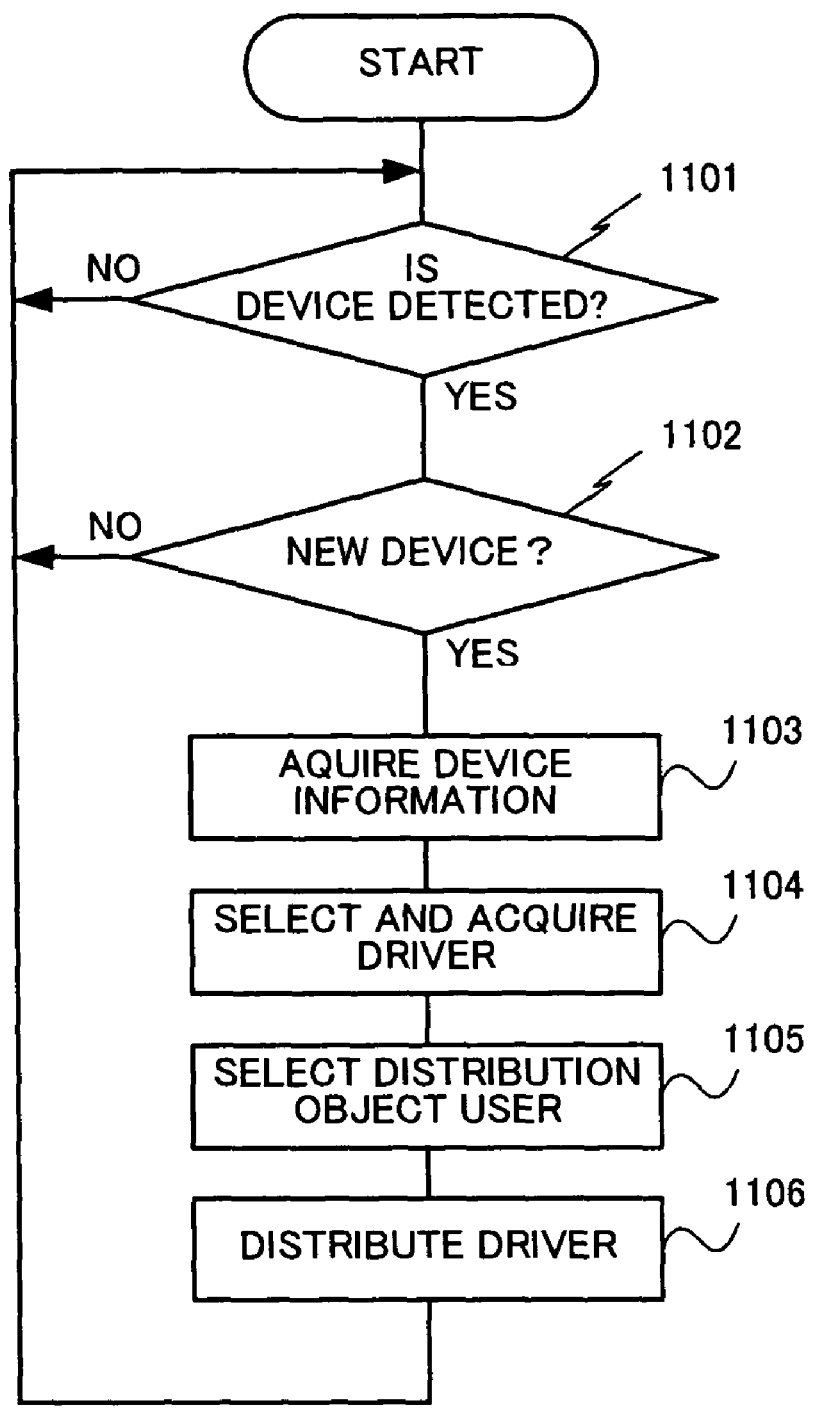
FIG. 15 is a flow chart illustrating the flow of distribution processing of the driver.

Next, the flow of distribution processing of the driver by the device management apparatus 1003 will be described. FIG. 15 is a flow chart illustrating the flow of distribution processing of the driver.

The device detection section 1031 detects a device connected to the network 1006 (YES at step 1101). When it is determined that the device detected is a newly installed device (YES at step 1102), the device detection section 1031 acquires the device information from the pertinent device, and stores the device information acquired in the device information management section 1032 (at step 1103).

Then, the device detection section 1031 acquires the driver corresponding to the detected device through a portion of the device management apparatus 1003 or a server connected to the network 1006, a server connected to another network which is connectable through the network 1006, or the like, and stores the acquired driver in the device information management section 1032 (at step 1104).

The user selection section 1035 compares the device information stored in the device information management section 1032 with the user information stored in the user information storage section 1034, and selects the users to whom the driver is to be distributed (at step 1105). The user information stored in the user information storage section 1034 is that which is previously acquired by the user information acquisition section 1033. If the user information is not acquired, it may be acquired by the user information acquisition section 1033 at this point of time.

When the users to whom the driver is to be distributed are selected by the user selection section 1035, the user selection section 1035 distributes the driver to the selected users (at step 1106), the distribution processing of the driver corresponding to the device which has been newly detected being ended, and the device management apparatus waits for another device being detected.

Next, the selection of the users by the user selection section 1035 will be described. The user selection section 1035 selects the users by comparing the device information with the user information. Here, examples of making comparison by using each of the location information indicating the installation location for the device, the address of the device, and the type of the device will be described.

Firstly, the case in which the location information for the device is used to select the users will be described. To utilize the location information, it is required that, when a device is installed, the manager register the location information indicating the installation location for the device in the pertinent device as the device information. In addition, it is necessary to incorporate the location information indicating the installation location for each user terminal 1005 in the user information.

Figure 16:
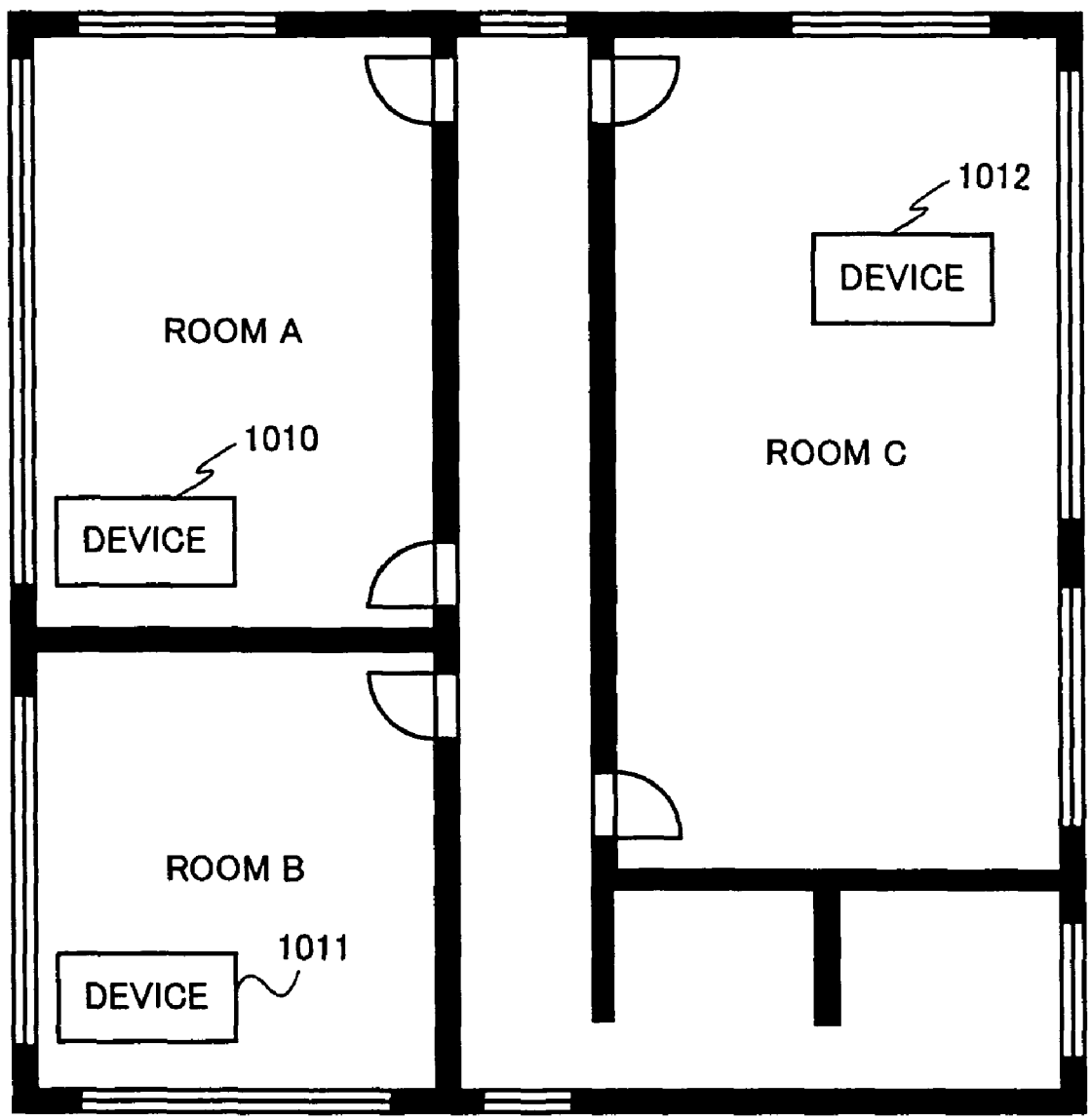
FIG. 16 is a drawing illustrating the method of selecting the user by the location information.

As the location information, "room A", "room B", and "room C" are registered for the device 1010, the device 1011, and the device 1012 as shown in FIG. 16, respectively. In this case, the user terminal installed in the "room A" is selected as an object to which the driver for the device 1010 is to be distributed, and the user terminal installed in the "room B" is selected as an object to which the driver for the device 1011 is to be distributed. Likewise, the user terminal installed in the "room C" is selected as an object to which the driver for the device 1012 is to be distributed.

When, with the device 1010 and the device 1011 being not installed, the device 1010 is to be newly installed such that the device 1010 is capable of being used by the user terminal installed in either the "room A" or the "room B", both the "room A" and the "room B" may be registered as the location information to be registered in the device 1010.

Secondly, the case in which the address of the device is used for selecting the users will be described. To utilize the address, it is required that, when a device is installed, the manager set the address in the device, however, address setting is an essential processing for a device connected to the network, and is not a processing provided specifically for the user selection according to the present invention.

Figure 17:
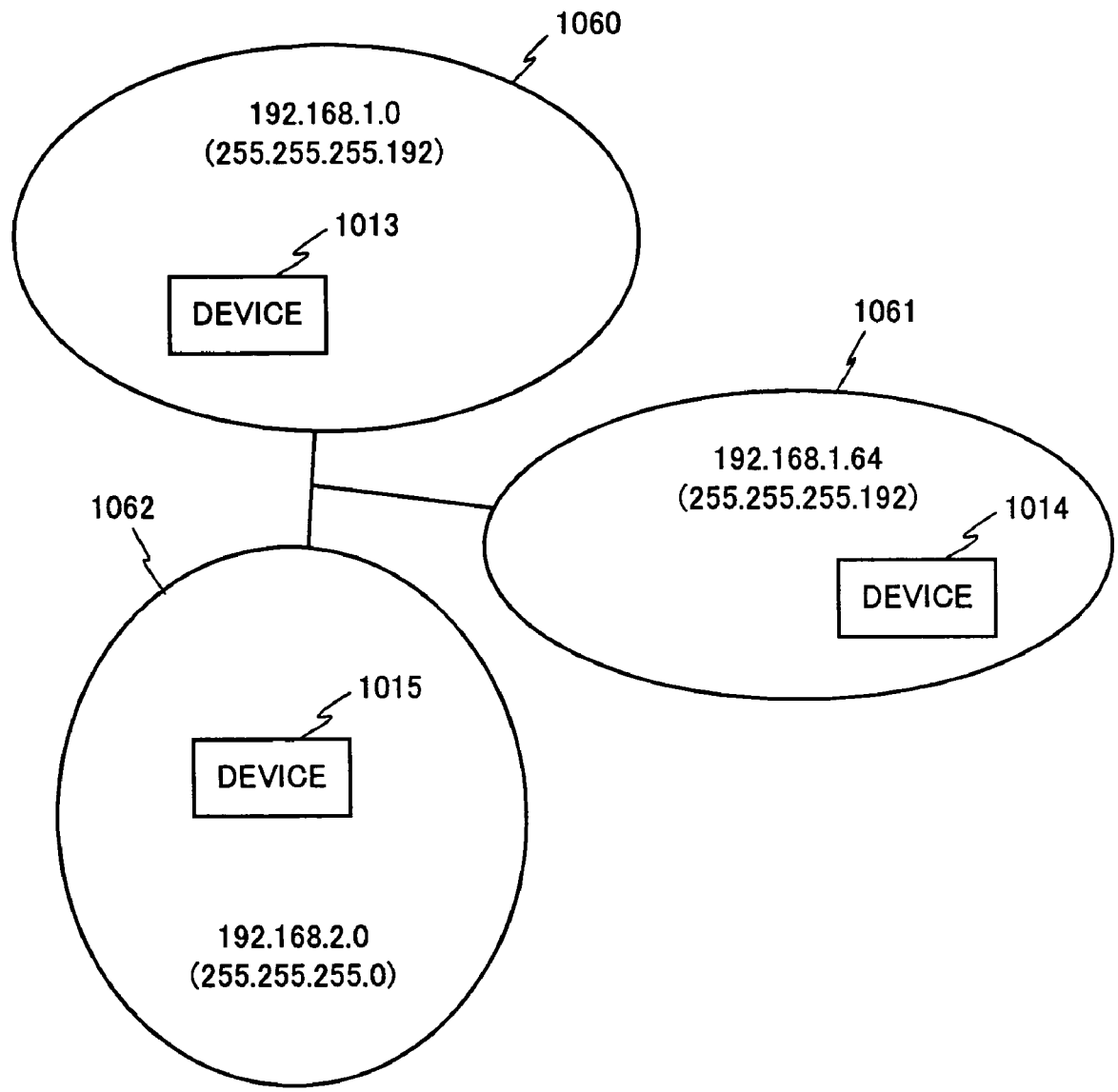
FIG. 17 is a drawing illustrating the method of selecting the user by the address.

Here, the case in which a device is connected to a network using the TCP/IP will be used as an example for description. As shown in FIG. 17, it is assumed that a device 1013, a device 1014, and a device 1015 are connected to a network 1060 having a network address of "192.168.1.0" and a subnet mask value of "255.255.255.192", a network 1061 having a network address of "192.168.1.64" and a subnet mask value of "255.255.255.192", and a network 1062 having a network address of "192.168.2.0" and a subnet mask value of "255.255.255.0", respectively.

In such a case, even if the network 1060, the network 1061, and the network 1062 are capable of communicating with one another, they are separate networks (subnets), respectively. With the network 1060, the address between "192.168.1.0" and "192.168.1.63" is used, thus also for the device 1013, any one of the addresses is set.

Therefore, by selecting the user terminals to which the address between "192.168.1.0" and "192.168.1.63" is provided, as the users to which the driver for the device 1013 is to be distributed, the driver is capable of being distributed only to the user terminals which are connected to the same network.

Thirdly, the case in which the type of the device is used for selecting the users will be described. To utilize the type of the device, each user is required to previously register the type of the device which is to be used, as the user information. Then, the driver is distributed to the users with which the type of the device installed is identical to the type of the device included in the user information. Selection of the users by the type of the device may be combined with the user selection using the above-mentioned location information or address such that the users selected by the location information or address are narrowed down by the type of the device.

By incorporating information other than described here in each of the device information and the user information, the mode of selection of the users by the user selection section 1035 may be adapted to a desired one.

Embodiment 7

Figure 18:
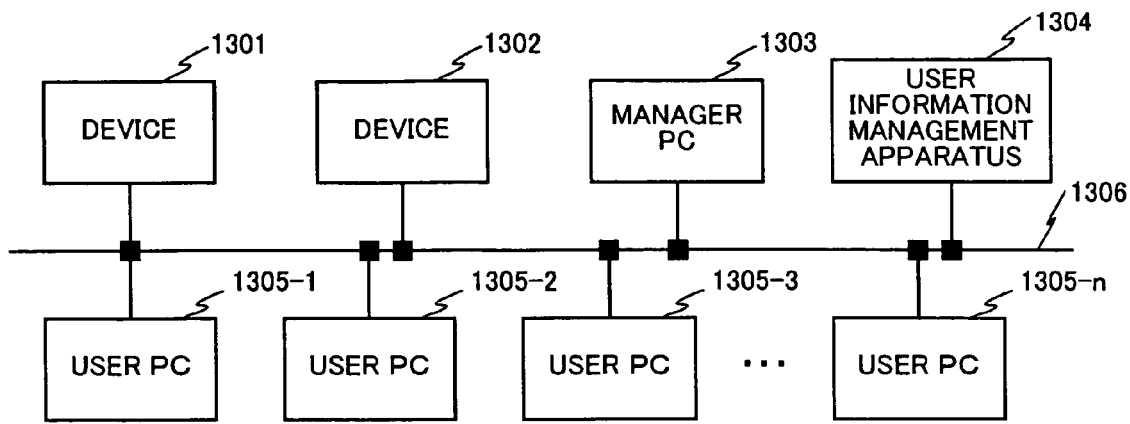
FIG. 18 is a diagram illustrating an example of configuration of the network in the embodiment 7.

FIG. 18 is a diagram illustrating an example of configuration of the network in the embodiment 7. In the example of configuration as illustrated in FIG. 18, a device 1301, a device 1302, a manager PC 1303, a user information management apparatus 1304, and a plurality of user PCs 1305 (1305-1 to 1305-n) are connected to one another through a network 1306.

The device 1301 and the device 1302 are such a device as a printer, and which must use a driver for the devices to be operable. The manager PC 1303 is an apparatus to which the present invention is applied, and which supplies a driver for the user PC 1305, for example.

The user information management apparatus 1304 is an apparatus, such as a directory server, which manages user information. The user information managed by this user information management apparatus 1304 is capable of being acquired by using the LDAP (lightweight directory access protocol) or the like. The user information management apparatus 1304 is not an apparatus which is always necessary.

User PCs 1305-1 to 1305-n are a PC which is used by the user of the device 1301 or the device 1302, respectively.

Figure 19:
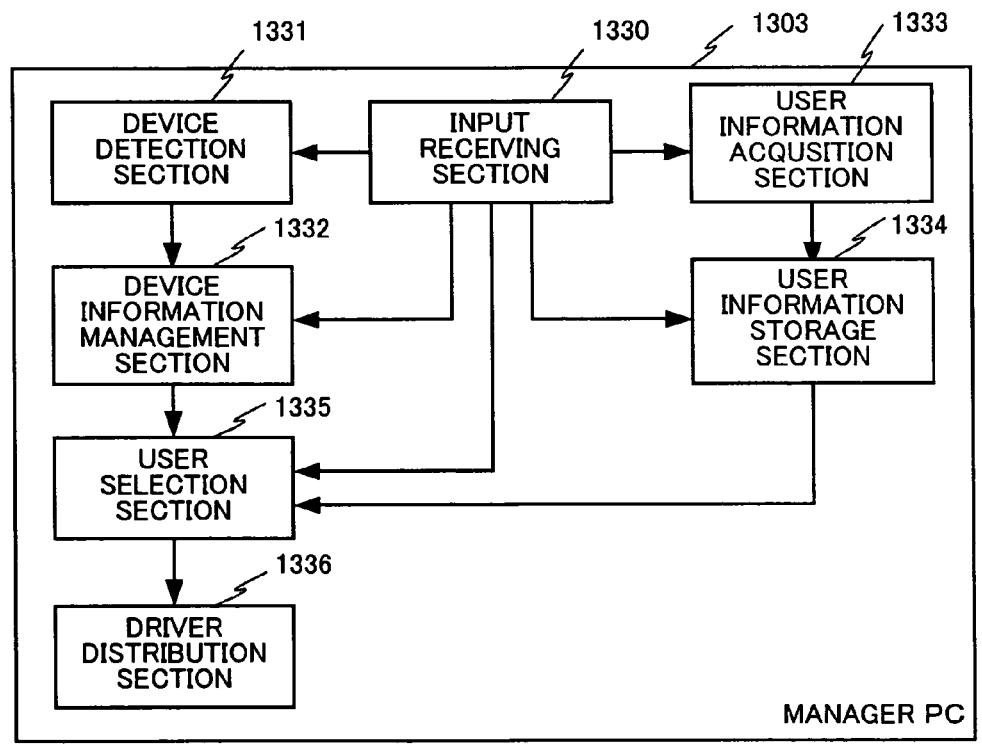
FIG. 19 is a block diagram illustrating the functional configuration of the PC manager 1303.

Now, the PC manager 1303 will be described. FIG. 19 is a block diagram illustrating the functional configuration of the PC manager 1303.

Referring to FIG. 19, the PC manager 1303 comprises an input receiving section 1330, a device detection section 1331, a device information management section 1332, a user information acquisition section 1333, a user information storage section 1334, a user selection section 1335, and a driver distribution section 1336. The input receiving section 1330, the device detection section 1331, the device information management section 1332, the user information acquisition section 1333, the user information storage section 1334, the user selection section 1335, and the driver distribution section 1336 are each implemented by operating the manager PC 1303 on the basis of the program.

The input receiving section 1330 receives an input of instruction or information by the manager, and notifies each of the device detection section 1331, the device information management section 1332, the user information acquisition section 1333, the user information storage section 1334, and the user selection section 1335 of the received instruction or information.

The device detection section 1331, the device information management section 1332, the user information acquisition section 1333, the user information storage section 1334, the user selection section 1335, and the driver distribution section 1336 correspond to the device detection section 1031, the device information management section 1032, the user information acquisition section 1033, the user information storage section 1034, the user selection section 1035, and the driver distribution section 1036 in the embodiment 6, respectively, and thus the description is omitted here.

The manager PC 1303 carries out basically the same processing as that carried out by the device management apparatus 1003 in the embodiment 6. However, the manager PC 1303 is different from the device management apparatus 1003 in that the manager is capable of instructing the timing of detection of a device, selection of the users, and the like.

Figure 20:
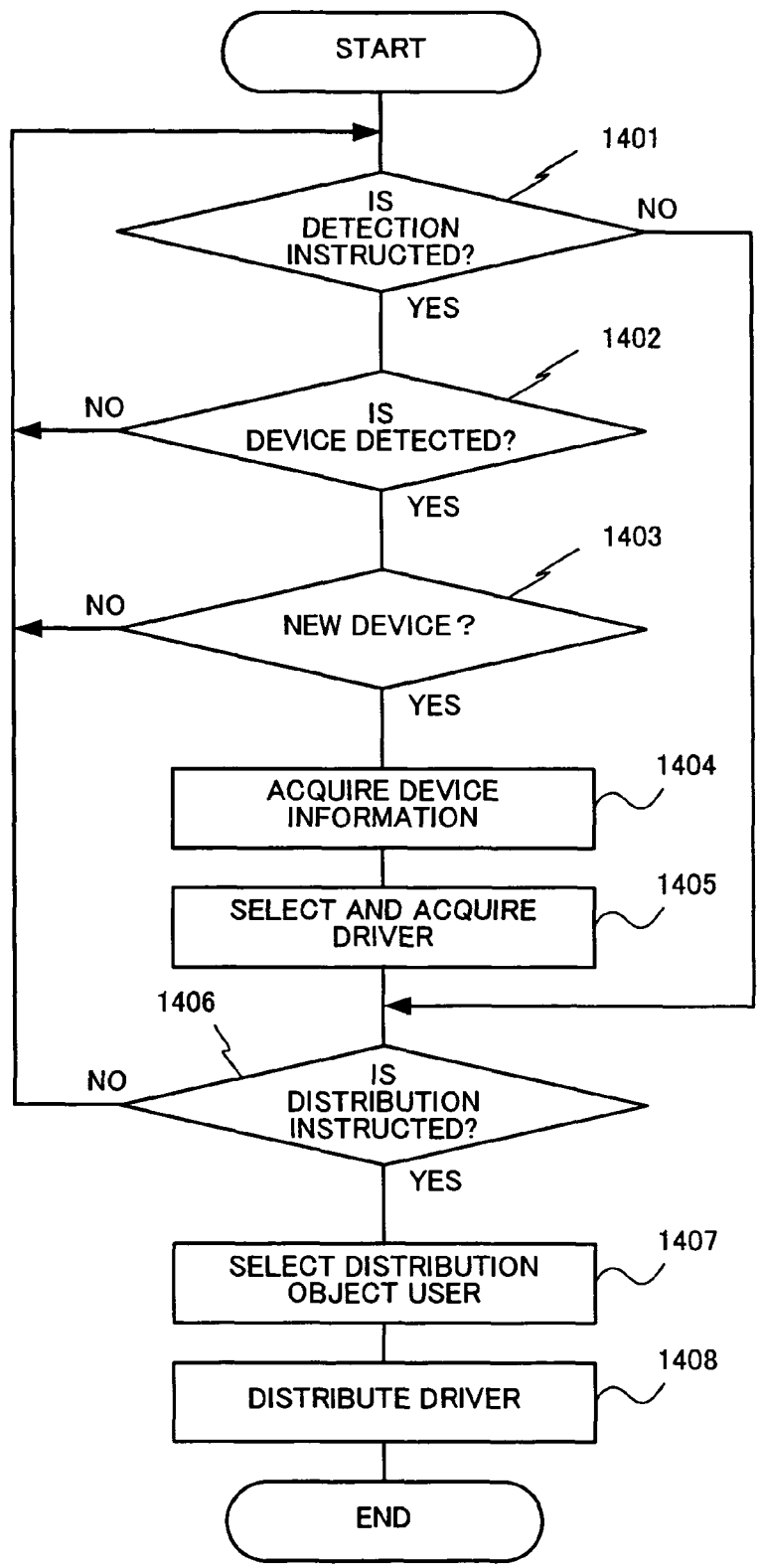
FIG. 20 is a flow chart illustrating the flow of distribution processing of the driver by the manager PC 1303.

Here, the flow of distribution processing of the driver by the manager PC 1303 will be described. When the manager PC 1303 is used to automatically distribute the driver, the manager PC 1303 carries out the same distribution processing as that carried out by the manager PC 1001, and thus the description is omitted here. FIG. 20 is a flow chart illustrating the flow of distribution processing of the driver by the manager PC 1303.

When detection is instructed by the manager (YES at step 1401), the device detection section 1331 detects a device connected to the network 1306 (YES at step 1402), and when it is determined that the device detected is a newly installed device (YES at step 1403), the device detection section 1331 acquires the device information from the pertinent device, and stores the device information acquired in the device information management section 1332 (at step 1404).

Then, the device detection section 1331 acquires the driver corresponding to the detected device through a portion of the manager PC 1303 or a server connected to the network 1306, a server connected to another network which is connectable through the network 1306, or the like, and stores the acquired driver in the device information management section 1332 (at step 1405).

When distribution of the diver is instructed by the manager (YES at step 1406), the user selection section 1035 compares the device information stored in the device information management section 1332 with the user information stored in the user information storage section 1334, and selects the users to whom the driver is to be distributed (at step 1407). At this time, the user selection section 1335 may indicate the selected users as the distribution objects to the manager, and cause the manager to add or delete a user. Then, the driver distribution section 1336 distributes the driver to the selected users (at step 1408), the distribution processing of the driver corresponding to the device which has been newly detected being ended.

The method of selecting the users by the user selection section 1335 is the same as the method of selecting the users by the user selection section 1035 in the embodiment 6, and thus the description is omitted here.

What is claimed is:

1. A driver management system, comprising:
   a user terminal that is connected to a first subnet among subnets which form a network; and
   a plurality of devices, each being connected to one of the subnets and requiring a driver for operation from the user terminal,
   wherein the user terminal comprises:
   an instruction detection section that detects a printing instruction;
   a driver retracting section that, when a corresponding driver to a device connected to a second subnet to which the user terminal is not currently connected has been installed on the detection of the printing instruction by the instruction detection section, retracts the corresponding driver so that the user terminal cannot recognize the corresponding driver, wherein the second subnet includes more than one device;
   a device detection section that detects devices connected to the first subnet to which the user terminal is currently connected after the corresponding driver is retracted by the driver retracting section;
   a driver acquisition section that, when a device for which a driver corresponding thereto is not installed is present among the devices detected by the device detection section, acquires a driver corresponding to the device; and
   an install processing section that installs the driver acquired by the driver acquisition section in the user terminal, wherein the driver acquisition section, when a driver corresponding to any of the devices detected by the device detection section has been retracted by the driver retracting section, acquires the driver by restoring the retracted driver.

2. The driver management system according to claim 1, wherein the driver retracting section comprises:
   a first identifying section that identifies the first subnet to which the user terminal is currently connected; and a second identifying section that identifies drivers that are already installed in the user terminal, and when a driver corresponding to a device connected to the second subnet other than the first subnet identified by the first identifying section is present among the drivers identified by the second identifying section, retracts the driver.

3. A user terminal that is connected to a first subnet of a network which configures the network and that operates a plurality of devices which require a driver for operation of the devices through the first subnet, comprising:

an instruction detection section that detects a printing instruction;

a driver retracting section that, when a corresponding driver to a device connected to a second subnet to which the user terminal is not currently connected has been installed on the detection of the printing instruction by the instruction detection section, retracts the corresponding driver so that the user terminal cannot recognize the corresponding driver, wherein the second subnet includes more than one device;

a device detection section that detects devices connected to the first subnet to which the user terminal is currently connected after the corresponding driver is retracted by the driver retracting section;

a driver acquisition section that, when a device for which a corresponding driver is not installed is present among the devices detected by the device detection section, acquires a driver corresponding to the device; and an install processing section that installs the driver acquired by the driver acquisition section to the user terminal, wherein the driver acquisition section, when a driver corresponding to any of the devices detected by the device detection section has been retracted by the driver retracting section, acquires the driver by restoring the retracted driver.

4. A driver management method of a system comprising a user terminal that is connected to a first subnet among subnets which configure a network, and a plurality of devices, each being connected to one of the subnets and requiring a driver for operation from the user terminal, the method comprising:

detecting a printing instruction;

retracting, on the detection of the printing instruction when a corresponding driver to a device connected to a second subnet to which the user terminal is not currently connected has been installed in the user terminal, the corresponding driver so that the user cannot recognize the corresponding driver, wherein the second subnet includes more than one device;

detecting devices connected to the first subnet to which the user terminal is currently connected after the corresponding driver is retracted by the driver retracting section;

when a device for which a corresponding driver is not installed is present among the detected devices, acquiring a driver corresponding to the device;

installing the acquired driver in the user terminal which detected the printing instruction; and when a driver corresponding to any of the detected devices has been retracted, acquiring the driver by restoring the retracted driver.

5. A non-transitory computer readable medium storing a program causing a computer to execute a process for controlling a user terminal which is connected to a subnet that is part of a network and uses a plurality of devices which each require a driver in use of the devices through the subnet, the process comprising:

detecting a printing instruction;

identifying a first subnet to which the user terminal is currently connected on the detection of the printing instruction;

identifying already installed drivers;

retracting, when a driver of a device connected to a second subnet other than the identified first subnet is present in the identified drivers, the driver so that the user cannot recognize the driver, wherein the second subnet includes more than one device, detecting devices connected to the first subnet to which the user terminal is currently connected;

acquiring, when a device for which a corresponding driver is not installed is present among the detected devices, a driver corresponding to the device;

installing the acquired driver; and when a driver corresponding to any of the detected devices has been retracted, acquiring the driver by restoring the retracted driver.

* * * * *